J. J. LASSALETTE.
EGG CASE.
APPLICATION FILED OCT. 20, 1913.

1,136,882.

Patented Apr. 20, 1915.
2 SHEETS—SHEET 1.

Witnesses

Inventor
J. J. Lassalette.
By
Attorney

J. J. LASSALETTE.
EGG CASE.
APPLICATION FILED OCT. 20, 1913.

1,136,882.

Patented Apr. 20, 1915.
2 SHEETS—SHEET 2.

Witnesses

Inventor
J. J. Lassalette.
By
Attorney

UNITED STATES PATENT OFFICE.

JOSEPH J. LASSALETTE, OF LOS ANGELES, CALIFORNIA.

EGG-CASE.

1,136,882.          Specification of Letters Patent.      Patented Apr. 20, 1915.

Application filed October 20, 1913. Serial No. 796,292.

*To all whom it may concern:*

Be it known that I, JOSEPH J. LASSALETTE, a citizen of the United States, residing at Los Angeles, in the county of Los Angeles and State of California, have invented certain new and useful Improvements in Egg-Cases; and I do hereby declare the following to be a full, clear, and exact description of the invention, such as will enable others skilled in the art to which it appertains to make and use the same.

This invention relates to egg cases designed for the purpose of safely packing and shipping eggs, and one of the principal objects of the same is to provide reliable and efficient means for packing the eggs in a manner that will insure their safety in transit and which will have a tendency to keep the eggs thoroughly cool and in a sanitary condition.

Another object of the invention is to provide a packing case for containing a number of egg trays or cell sections, said cell sections being formed of asbestos fabric bound with tin or similar rigid material to give stability to the asbestos material and to provide a series of mats or cushioning members upon which the egg trays or cells are supported, said trays or cushions being formed of a sheet of asbestos interposed between two layers of wire cloth of the required mesh to render the mat or cushion elastic and resilient so that the eggs resting upon the same will not be liable to become broken in transit.

Figure 1:
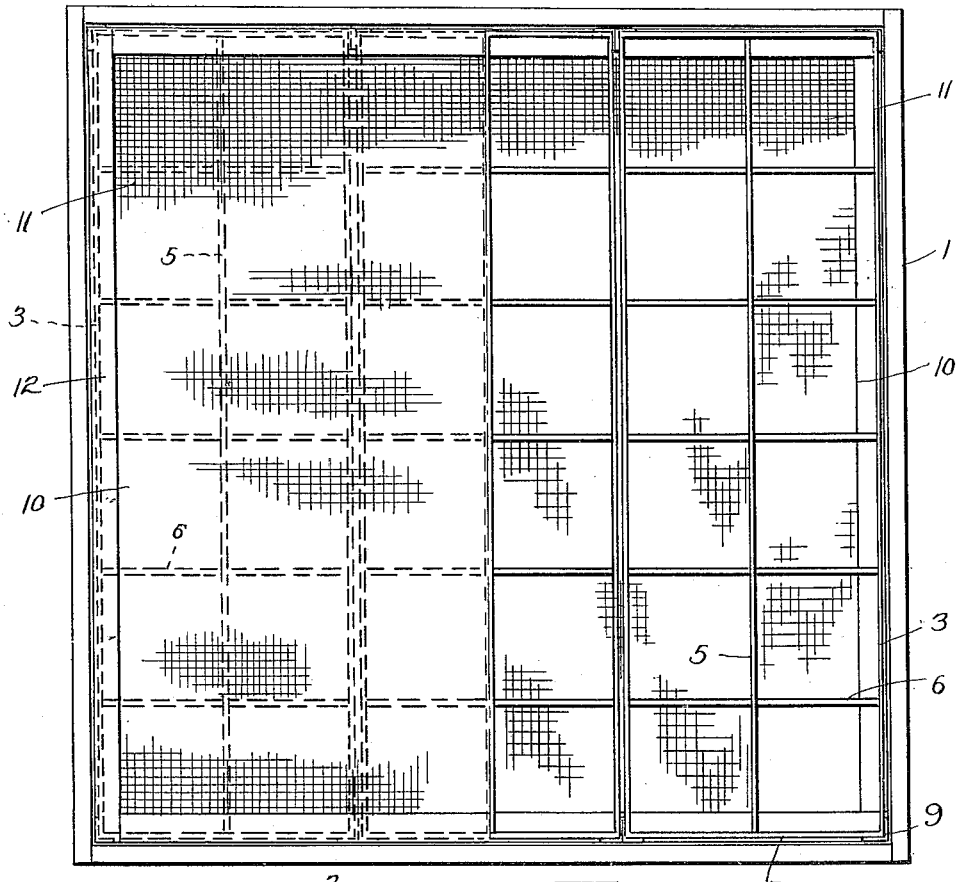
Figure 3:
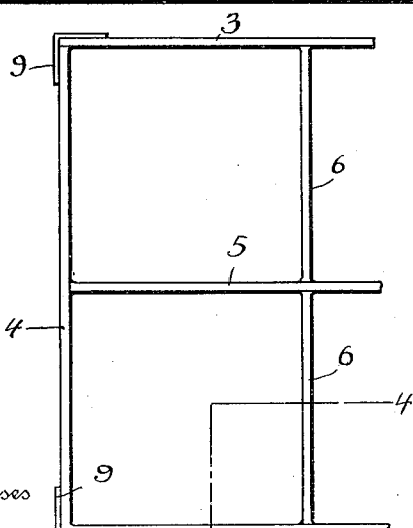
Figure 4:
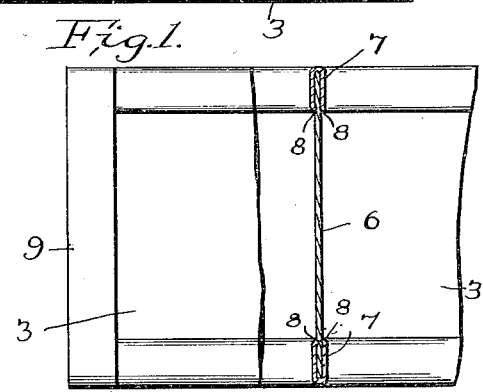
Figure 2:
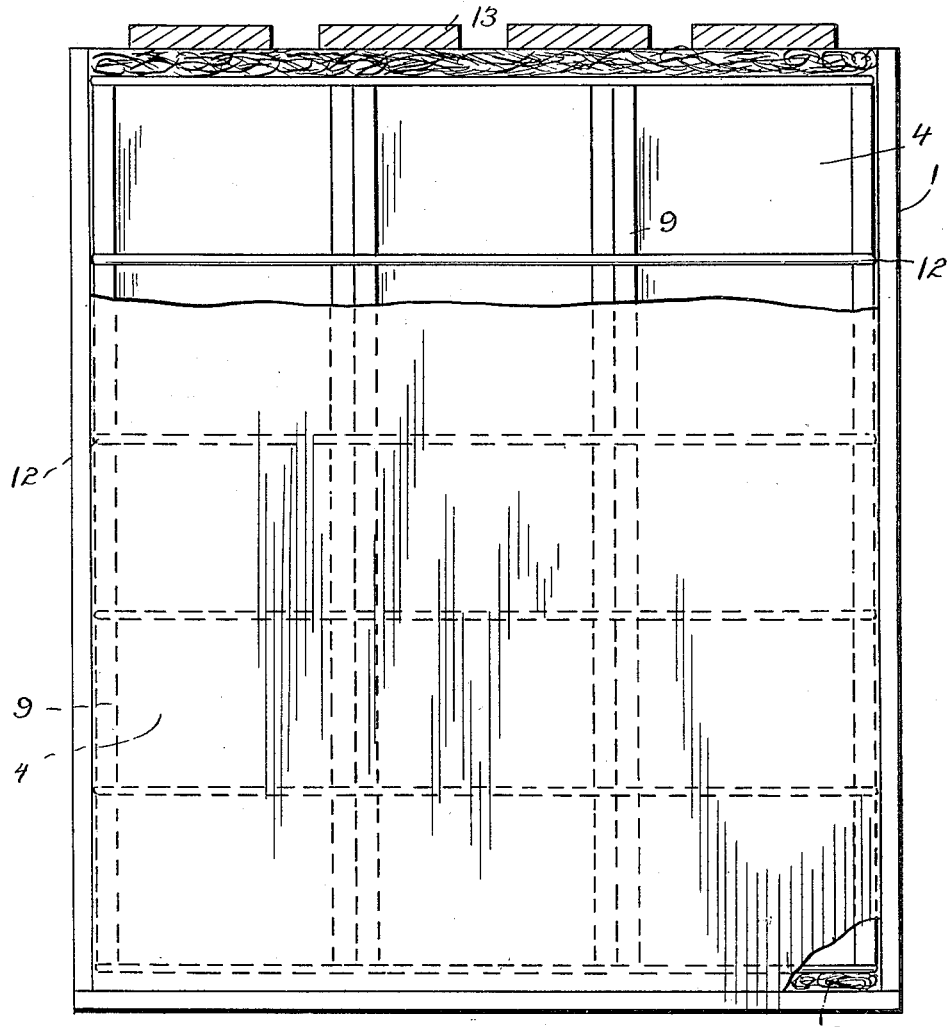
Figure 5:
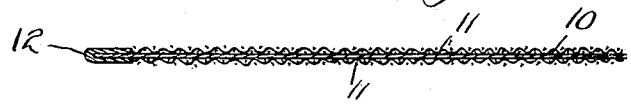

The objects and advantages referred to may be attained by means of the construction illustrated in the accompanying drawings, in which, Figure 1 is a top plan view of an egg case with the cover removed and one half of the cushion or mat cut away to illustrate the egg trays or cells underneath the same, Fig. 2 is a side elevation of the egg case with a portion of one of the side walls broken away to illustrate the interior arrangement of egg cells, Fig. 3 is a plan view of one of the egg cell trays made on an enlarged scale, Fig. 4 is a sectional view taken on line 4—4 of Fig. 3, Fig. 5 is a view showing the mat or cushion in section.

Referring to the drawings the numeral 1 designates the egg case which may be made of any suitable light supporting wood and of a size to contain a given number of egg cells and to permit the insertion of a quantity of excelsior 2 or other similar cushioning material between the ends and sides of the egg trays.

The egg trays each comprise the sides 3, the ends 4, the central partition 5 and the cross partitions 6, which are made of an asbestos fabric or material which is elastic or flexible. To give stability to the egg tray or cell the upper and lower edges of the material are bound with a tin binding 7, said binding being bent inwardly as at 8 at its lower edges to contact with the material of the sides or partition. Corner braces 9 are provided for giving strength to the cells.

The mats or cushions each comprise an intermediate layer of asbestos fabric or material 10 and on opposite sides thereof a wire cloth cover 11, said wire cloth being of comparatively fine mesh and of fine gauze wire so as to render the mat resilient. The mat or cushion is bound upon all its sides by means of a tin binding strip 12 and these mats or cushions are interposed between each layer of egg cell trays. As shown there are three sections of these cell trays which practically cover the rectangular area of the box and upon each layer there is a mat or cushion. The entire case as shown is made to contain fifteen sections each section containing one dozen eggs.

It will be understood of course that any suitable size of case may be made to contain any required number of egg cells. The cover 13 of the egg case may be made of suitable slats separated sufficiently to give ventilation to the interior of the case.

From the foregoing it will be obvious that an egg case made in accordance with my invention can be manufactured at a low cost, is light in weight, is strong and durable and that the eggs packed in the egg cells will be kept in cool and sanitary condition owing to the presence of asbestos which is fire proof and a good non-conductor of heat and that the mats or cushions will take up the shocks and jars incident to travel while the sides and ends of the egg cells are sufficiently flexible and soft to insure safety to the eggs in transit.

What is claimed is:—

An egg case comprising a box, said box divided into sections adapted to form a series of egg cells, each section being formed of asbestos fabric sides, ends, and partitions, having a metal binding at the top and bottom, and metal corner pieces, a mat disposed between the sections, said mat being formed of an intermediate layer of asbestos fabric, and a sheet of resilient wire cloth upon opposite sides thereof, said mat being bound by a rigid material.

In testimony whereof I affix my signature in presence of two witnesses.

JOSEPH J. LASSALETTE.

Witnesses:
ADA M. ROBINSON,
CECIL C. CLARK.